US007082614B2

(12) United States Patent
Bender

(10) Patent No.: US 7,082,614 B2

(45) Date of Patent: Jul. 25, 2006

(54) SYSTEM FOR IDENTIFICATION OF SMART CARDS

(75) Inventor: Michael S. Bender, Boulder Creek, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 800 days.

(21) Appl. No.: 09/801,410

(22) Filed: Mar. 8, 2001

(65) Prior Publication Data

US 2002/0129266 A1 Sep. 12, 2002

(51) Int. Cl.
*H04L 9/32* (2006.01)

(52) U.S. Cl. ............................................ 726/9; 726/20

(58) Field of Classification Search ................ 713/172, 713/192–194, 200–202, 182–186, 168; 705/50, 705/56, 65–67, 70; 235/380, 382, 375, 492, 235/462.45; 726/2, 9, 20

See application file for complete search history.

(56) References Cited

U.S. PATENT DOCUMENTS

| | | | | |
|---|---|---|---|---|
| 4,980,542 | A * | 12/1990 | Jackson et al. | 235/375 |
| 5,307,411 | A * | 4/1994 | Anvret et al. | 713/169 |
| 5,983,273 | A * | 11/1999 | White et al. | 709/229 |
| 6,223,984 | B1 * | 5/2001 | Renner et al. | 235/380 |
| 6,577,733 | B1 * | 6/2003 | Charrin | 380/251 |
| 6,615,264 | B1 * | 9/2003 | Stoltz et al. | 709/227 |

OTHER PUBLICATIONS

Steve Gold, Schlumberger Unveils E-Cash Enabled Smart Loyalty Card Apr. 24, 1997, Newswire.*

* cited by examiner

*Primary Examiner*—Hosuk Song

(74) *Attorney, Agent, or Firm*—Martine Penilla & Gencarella, LLP

(57) ABSTRACT

The present invention relates to a system which allows third-party smart cards to be recognized by computing devices configured to receive smart cards. According to one or more embodiments of the present invention, a smart card is presented to a computing device. One or more token IDs are extracted from the smart card. Thereafter, a token type is obtained. In one embodiment, a probe order file is consulted first when the smart card is presented to the computing device. The probe order file is configured to direct a computing device to consult the correct configuration files in the correct order. Using the probe order file, the device inspects each configuration file specified in order. The probing is halted after a configuration file successfully returns a usable identification and card type. If the probing goes through every configuration file and there is no match then the smart card cannot be utilized.

22 Claims, 11 Drawing Sheets

FIG. 8: HID

FIG. 9: HID Single Chip Implementation

SYSTEM FOR IDENTIFICATION OF SMART CARDS

BACKGROUND OF THE INVENTION

1. Field of the Invention

The present invention relates to a system specifically designed to allow third-party smart cards to be recognized by computing devices configured to receive smart cards.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

In modern computing it is desirable for a user to be interacting with a computing device, to stop interacting with the device, to move to a new location, and to begin interacting with a new device at precisely the point where the user stopped interacting with the first device. To perform such an activity a "smart card" may be used. A smart card is a card-like device that is physically inserted into the device and read by the device. The smart card provides information to the new device, for instance, that enables it to locate the data and computer programs necessary to re-create the user's interaction that was terminated on the old device.

To enable a computing device to understand the information a smart card is providing, a system must be used whereby the computing device is instructed how to interact with the smart card. Current systems that enable the use of smart cards, however, are inadequate because typically the system only applies to a single type of smart card that is to be used on a single type of device. There is no mechanism whereby a third-party smart card may be configured to operate with any given device. Before further discussing the drawbacks of current schemes, it is instructive to discuss how the nature of computing is changing.

The Nature of Computing

The nature of computing is changing. Until recently, modern computing was mostly "machine-centric", where a user accessed a dedicated computer at a single location. The dedicated computer had all the data and computer programs necessary for the user to operate the computer, and ideally, it had large amounts of hardware, such as disk drives, memory, processors, and the like. With the advent of computer networks, however, different computers have become more desirable and the focus of computing has become "service-oriented". In particular, computer networks allow a user to access data and computer programs that exist elsewhere in the network. When the user accesses such data or computer programs, the remote computer is said to be providing a service to the user. With the improvement in services available to users, the need to have a dedicated computer following the machine-centric paradigm is greatly reduced. The machine-centric paradigm also becomes much less practical in this environment because distributing services is much more cost-effective.

In particular, computers in a service-oriented environment have little need for powerful hardware. For instance, the remote computer processes the instructions before providing the service, so a powerful processor is not needed locally. Similarly, since the service is providing the data, there is little need to have large capacity disk drives locally (or on the local access hardware). In such an environment, one advantage is that computer systems have been implemented that allow a user access any computer in the system and still use the computer in the same manner (i.e., have access to the same data and computer programs).

For instance, a user may be in location A and running a word processor, a web browser, and an interactive multimedia simulation. In a service-oriented environment, the user might stop using the computer in location A and move to location B where the user could resume these computer programs on a different machine at the exact point where the user stopped using the machine at location A, as long as both computers had access via the computer network to the serves where the programs were being executed. An architecture that makes such an interaction possible is described below.

Multi-Tier Application Architecture

In the multi-tier application architecture, a client communicates requests to a server for data, software and services, for example, and the server responds to the requests. The server's response may entail communication with a database management system for the storage and retrieval of data.

The multi-tier architecture includes at least a database tier that includes a database server, an application tier that includes an application server and application logic (i.e., software application programs, functions, etc.), and a client tier. The application server responds to application requests received from the client. The application server forwards data requests to the database server.

FIG. 1 provides an overview of a multi-tier architecture. Client tier 100 typically consists of a computer system that provides a graphic user interface (GUI) generated by a client 110, such as a browser or other user interface application. Conventional browsers include Internet Explorer and Netscape Navigator, among others. Client 110 generates a display from, for example, a specification of GUI elements (e.g., a file containing input, form, and text elements defined using the Hypertext Markup Language (HTML)) and/or from an applet (i.e., a program such as a program written using the Java™ programming language, or other platform independent programming language, that runs when it is loaded by the browser).

Further application functionality is provided by application logic managed by application server 120 in application tier 130. The apportionment of application functionality between client tier 100 and application tier 130 is dependent upon whether a "thin client" or "thick client" topology is desired. In a thin client topology, the client tier (i.e., the end user's computer) is used primarily to display output and obtain input, while the computing takes place in other tiers. A thick client topology, on the other hand, uses a more conventional general purpose computer having processing, memory, and data storage abilities. Database tier 140 contains the data that is accessed by the application logic in application tier 130. Database server 150 manages the data, its structure and the operations that can be performed on the data and/or its structure.

Application server 120 can include applications such as a corporation's scheduling, accounting, personnel and payroll applications, for example. Application server 120 manages requests for the applications that are stored therein. Application server 120 can also manage the storage and dissemination of production versions of application logic. Database server 150 manages the database(s) that manage data for applications. Database server 150 responds to requests to access the scheduling, accounting, personnel and payroll applications' data, for example.

Connection 160 is used to transmit data between client tier 100 and application tier 130, and may also be used to transfer the application logic to client tier 100. The client tier can communicate with the application tier via, for example, a Remote Method Invocator (RMI) application programming interface (API) available from Sun Microsystems™. The RMI API provides the ability to invoke methods, or software modules, that reside on another computer system. Parameters are packaged and unpackaged for transmittal to and from the client tier. Connection 170 between application server 120 and database server 150 represents the transmission of requests for data and the responses to such requests from applications that reside in application server 120.

Elements of the client tier, application tier and database tier (e.g., client 110, application server 120 and database server 150) may execute within a single computer. However, in a typical t system, elements of the client tier, application tier and database tier may execute within separate computers interconnected over a network such as a LAN (local area network) or WAN (wide area network).

Smart Cards

In a multi-tier computer architecture computing sessions may be moved between computers in the network. One way to move between computers and to resume the user's computing session is to use a smart card. Typically each type of computing system uses only one type of smart card. There is no way for a third-party to take a generic smart card and configure it to be able to interact with a specific computing system because there is currently no system with which a developer may create instructions to perform such an action.

SUMMARY OF THE INVENTION

The present invention relates to a system specifically designed to allow third-party smart cards to be recognized by computing devices configured to receive smart cards. According to one or more embodiments of the present invention, a smart card is presented to a computing device. Then, one or more token IDs are extracted from the smart card. The token ID is an identifier that is unique to each smart card. Thereafter, a token type is obtained. The token type identifies a particular type of smart card. The token type is utilized to identify each group of smart cards that require different communications or utilize different identifiers. In one embodiment, the token type is extracted from the smart card. In another embodiment, a configuration file supplies the token type.

In one embodiment, a probe order file is consulted first when the smart card is inserted. The probe order file is configured to direct a computing device to consult the correct configuration files in the correct order. Using the probe order file, the device inspects each configuration file specified in order. The probing is halted after a configuration file successfully returns a usable identification and card type. If the probing goes through every configuration file and there is no match then the smart card cannot be utilized.

In one embodiment, the insertion of the smart card causes the computing device to initiate a process on a remote computer (a server, for instance) connected to the computing device via a computer network. The remote computer performs the probing and the identification process and returns a message to the computing device whether the smart card has been identified or not.

The configuration files may be created by software developers in any language that allows the extraction of a token ID and a token type. Such languages include FORTH-like languages where operators may be set, such as bit and byte operations, math, reading, and writing.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention relates to a system for identification of smart cards. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

According to one or more embodiments of the present invention, a smart card is presented to a computing device. Then, one or more token IDs are extracted from the smart card. The token ID is an identifier that is unique to each smart card. Thereafter, a token type is obtained. The token type identifies a particular type of smart card. The token type is utilized to identify each group of smart cards that require different communications or utilize different identifiers.

System for Identification of Smart Cards

Figure 1:
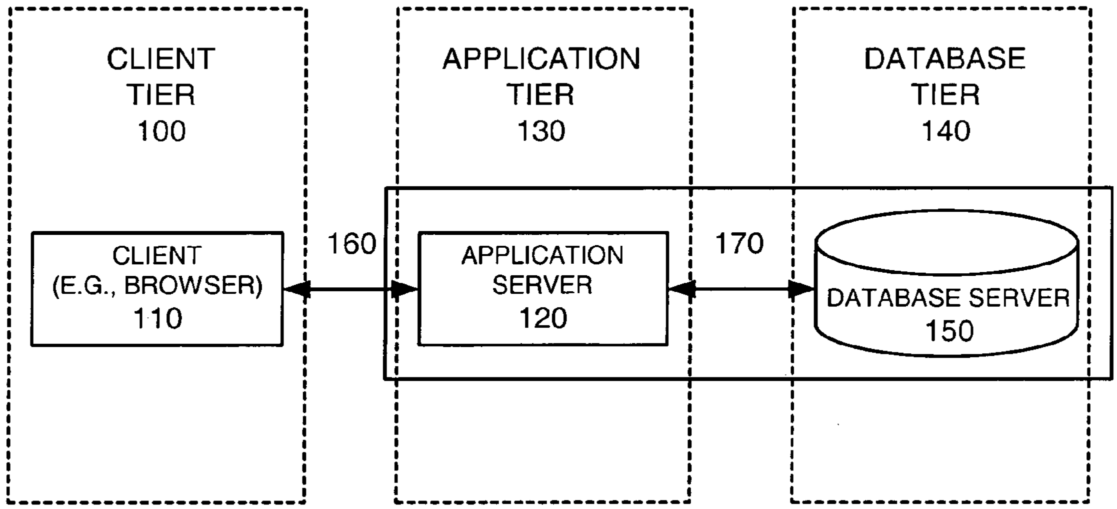
FIG. 1 is a diagram showing the multi-tier computer architecture.
Figure 2A:
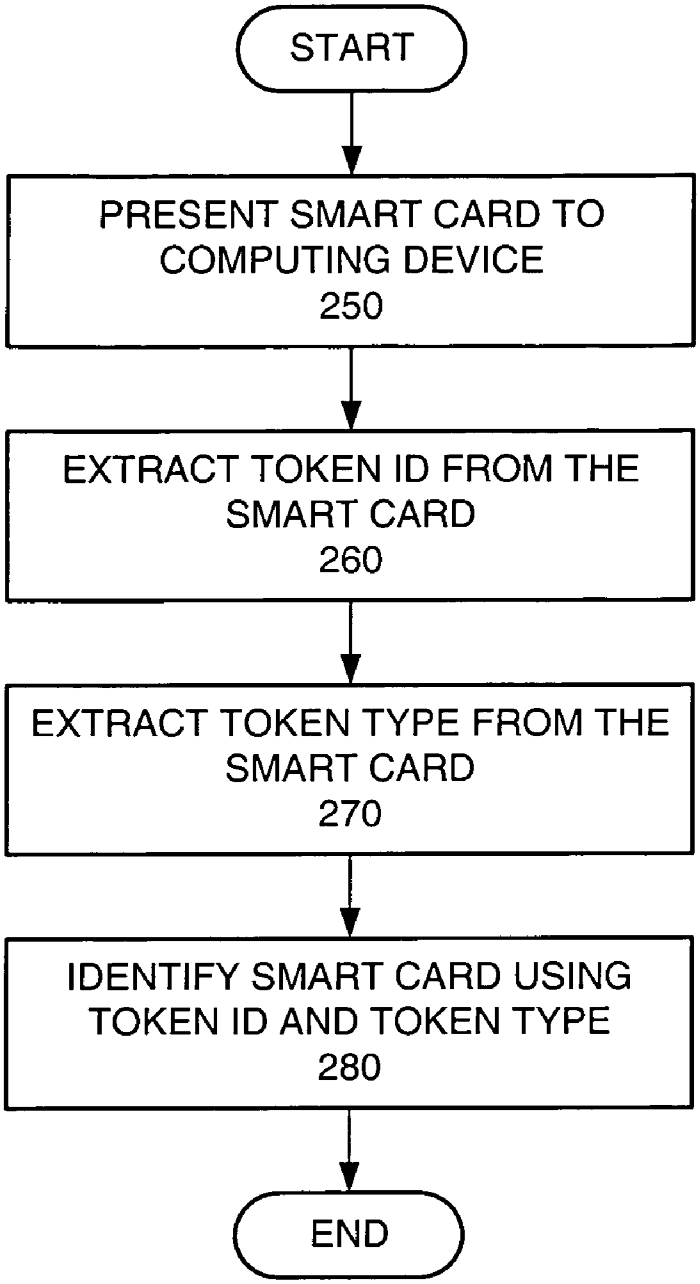
FIG. 2A shows a system for identification of smart cards according to an embodiment of the present invention.

One embodiment of the present invention is shown in FIG. 2A. At step 250 a smart card is presented to a computing device. Then, at step 260, a token ID is obtained by extracting it from the smart card. Next, at step 270, a token type is obtained by extracting it from the smart card. Thereafter, the token ID and token type are used to identify the smart card at step 280.

Figure 2B:
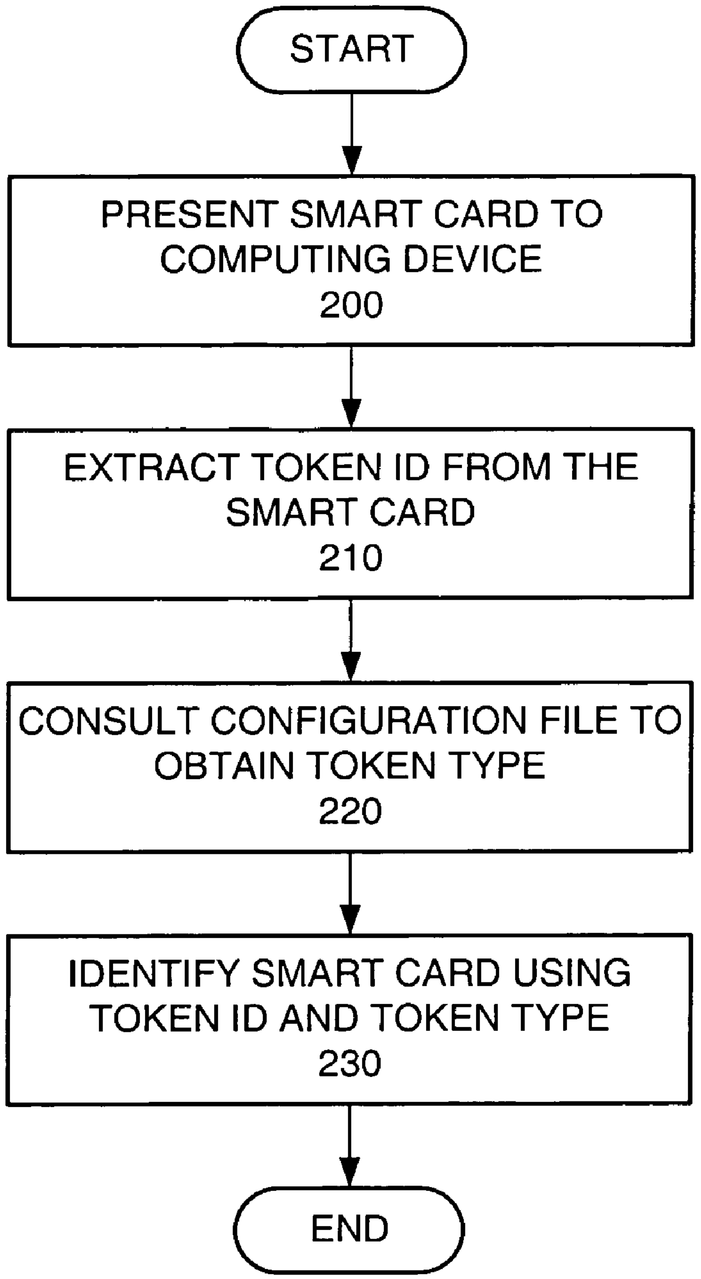
FIG. 2B shows a system for identification of smart cards according to another embodiment of the present invention.

In the embodiment shown in FIG. 2A, the token type is extracted directly from the smart card. In another embodiment, shown in FIG. 2B, the token type is obtained from a configuration file. In this embodiment, a smart card is presented to a computing device at step 200. Then, at step 210, a token ID is obtained by extracting it from the smart card. Next, at step 220, a token type is obtained by consulting a configuration file. The configuration file will be explained in more detail below, but generally it is a file that interprets potential valid token ID's and associates a correct token type with a token ID. Thereafter, the token ID and token type are used to identify the smart card at step 230.

Probe Order File

In one embodiment, a probe order file is consulted when the smart card is inserted. The probe order file is configured to direct a computing device to the correct configuration files in the correct order. Using the probe order file, the device inspects each configuration file specified in order. The probing is halted after a configuration file successfully returns a usable identification and card type. If the probing goes through every configuration file and there is no match then the smart card cannot be utilized.

Figure 3:
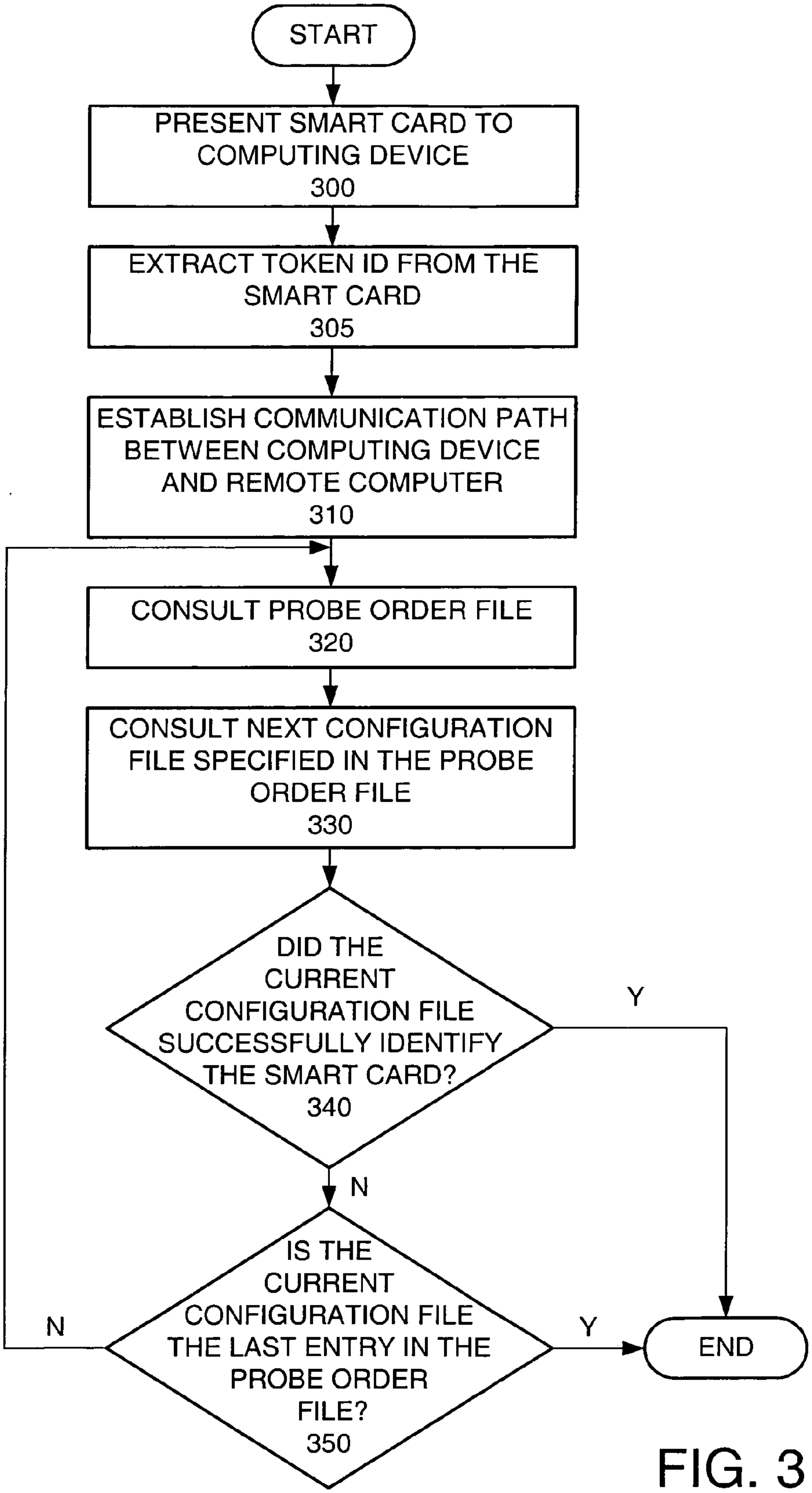
FIG. 3 shows a system where a server identifies the smart card according to an embodiment of the present invention.

In one embodiment, the insertion of the smart card causes the computing device to initiate a process on a remote computer (a server, for instance) connected to the computing device via a computer network. The remote computer performs the probing and the identification process and returns a message to the computing device whether the smart card has been identified or not. This embodiment of the present invention is shown in FIG. 3.

At step 300, a smart card is presented to a computing device. Next, at step 305, a token ID is extracted from the smart card. At step 310, a communication path between the device and a remote computer is established. Then, at step 320, the remote computer consults a probe order file. Using the probe order file, the remote computer consults a configuration file specified by the probe order file at step 330. At step 340, it is determined whether the current configuration file resulted in a successful identification of the smart card.

If the current configuration file did in fact result in a successful identification of the smart card, the process is complete. If the current configuration file did not correctly identify the smart card, it is determined at step 350 whether this configuration file is the last one specified by the probe order file. If it is, the smart card cannot be used and the process ends. Otherwise, the process repeats at step 330, where the next configuration file specified by the probe order file is consulted.

System Architecture

Figure 4:
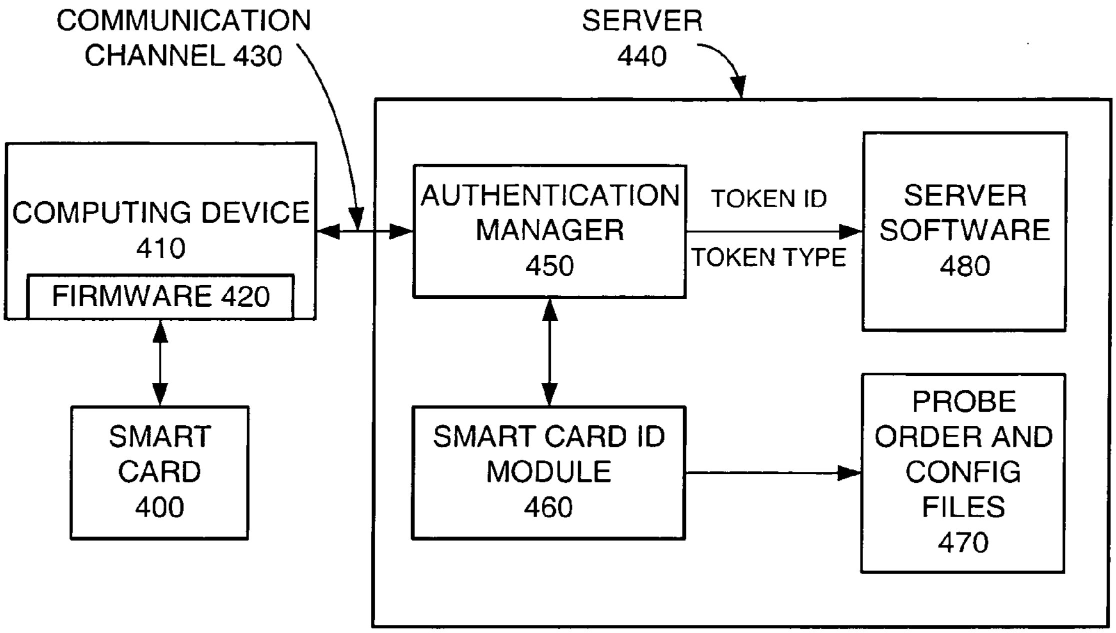
FIG. 4 shows a system for identification of smart cards where a probe order file is used according to an embodiment of the present invention.

FIG. 4 is a block diagram of the system architecture for one embodiment of the present invention. Smart card 400 is configured to be presented to computing device 410, for instance by inserting it into a specific slot. The computing device 410 has firmware 420 installed on it. Firmware 420 is configured to initiate the identification of the smart card when it is inserted into computing device 410.

To do so, a communication channel 430 is established between a server 440 and the firmware 420. In particular, an authentication manager 450 resides at the other end of the communication channel 430 and interfaces with a smart card ID module 460 to handle requests for identification of the card. The smart card ID module 460 utilizes the probe order and configuration files 470. The probe order and configuration files 470 may be stored on server 440 using any well known directory service, such as lightweight directory access protocol (LDAP).

If the probe order and configuration files result in a successful identification of the smart card, server software 480 is used to re-create the data and computer programs necessary for the user of the computing device 410 to begin working with the device.

File Token and Communication Formats

It should be understood that any applicable formats for the files, tokens, and communication mechanisms may be used. In one embodiment, however, the token ID is treated as a string that may be up to 32 characters in length. The string may consist of the character sets: [A–Z] [a–z] and [0–9]. Typically, the configuration file returns the token ID to the system as a string of hex digits, for example:

0001035d650001000

The token type is typically the name of the card or the card family that the configuration file is processing. The token type is treated as a string and follows the same rules for encoding the token ID. Typically, the configuration file returns the token type to the system as a string of hex digits, for example:

MicroPayflex

In one embodiment, the token type for a smart card is identified via a configuration file. The token type is utilized to identify each group of smart cards that require different communications or utilize different identifiers. One configuration file is typically required for each card type. Configuration files are normally in ASCII text and consist of two parts:

Administration/installation header information; and

Language Tokens

The probe order file is utilized to determine which smart card configuration files are used and in what order. Typically the probe order file is an ASCII text file that consists of fully qualified path names to card configuration files. One configuration file is listed per line. The probe order is maintained by any well known directory service, such as LDAP. To extract data from a smart card, the smart card should be capable of communicating via an answer to reset (ATR) and/or issuing one or more application protocol data units (ADPU) to the card.

Creating Configuration Files

Developers may create configuration files to operate with the present invention so that a smart card of their choice may be configured to operate with any computing system they choose. In this scenario, the developer creates a configuration file that performs the required operations on the smart card to extract a token ID or token type. In one embodiment, a FORTH-like language is used to set operators such as bit and byte operations, math, reading and writing. For some cards, the token type and token ID may be delivered in the ATR Other cards select a file to read.

Figure 5:
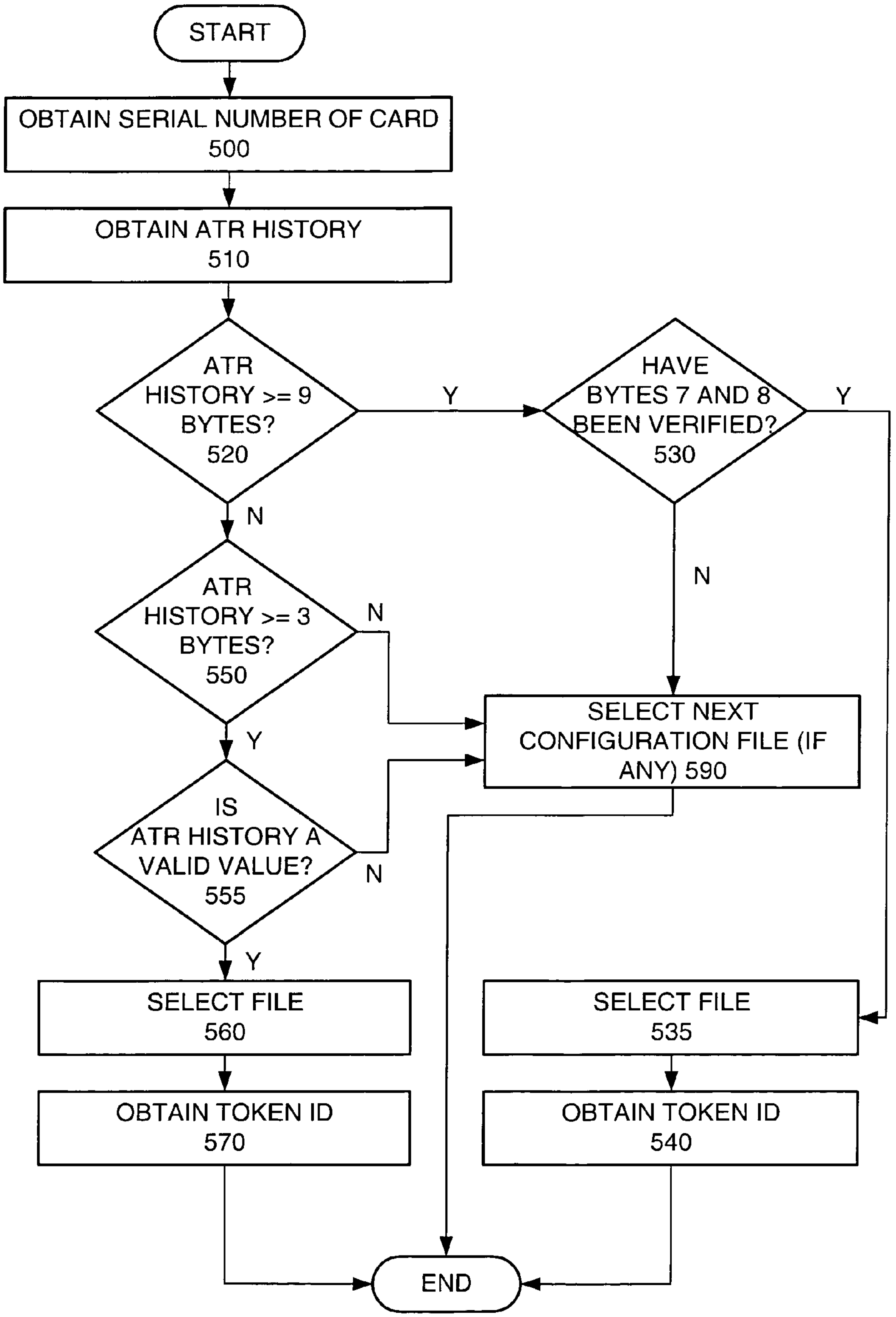
FIG. 5 is a flowchart showing the operation of a configuration file according to an embodiment of the present invention.

An example of the steps a configuration file takes that operates on a Schlumberger MicroPayflex smart card is shown in FIG. 5. This type of card has a file 0x0002 under the top directory which contains an 8-byte vendor-supplied unique card ID. First, the command 0x00B20000 is executed to get the serial number at step 500. Then it is determined if this is an old or a new MicroPayflex card. Old MicroPayflex cards have a "short" ATR which has a 3-byte history section. New MicroPayflex cards have a longer ATR which ends in 0x00A9. Thus, at step 510, the ATR history is obtained.

Next, it is determined if the ATR history is greater than or equal to nine byes in length at step 520. If it is, it is verified at step 530 that byte 7 of the ATR history is 0x00 and byte 8 of the ATR history is 0xa9. If these bytes do not have these values, it is concluded that the present card is not a MicroPayflex card that can be identified, so the next configuration file (if any) is selected at step 590 to try to identify the card. If, however, at step 530 bytes 7 and 8 are verified, file 0x0002 is selected at step 535 and at step 540 8 bytes of the record are read to retrieve the token ID. The result of reading the record must be at least 8 bytes in length. The first 8 bytes of the result are the ID.

If at step 520 the ATR history is not greater than or equal to nine bytes in length, the card might be an old MicroPayflex card, so it is determined if the ATR history is 3 bytes in length at step 550. If the ATR history is not 3 bytes in length, it is concluded that the present card is not a MicroPayflex card that can be identified, so the next configuration file (if any) is selected at step 590 to try to identify the card.

Otherwise, it is determined at step 555 if the 3-byte history is a valid value. The 3-byte ATR history may take on one of several values. All of the following values are legal for the old MicroPayflex cards:

3513ff

351180

354080

If the ATR history is not one of these values, it is concluded that the present card is not a MicroPayflex card that can be identified, so the next configuration file (if any) is selected at step 590 to try to identify the card. Otherwise, file 0x0002 is selected at step 560 and at step 570 8 bytes of the record are read to retrieve the token ID. The result of reading the record must be at least 8 bytes in length. The first 8 bytes of the result are the ID.

Virtual Desktop System Architecture

Figure 6:
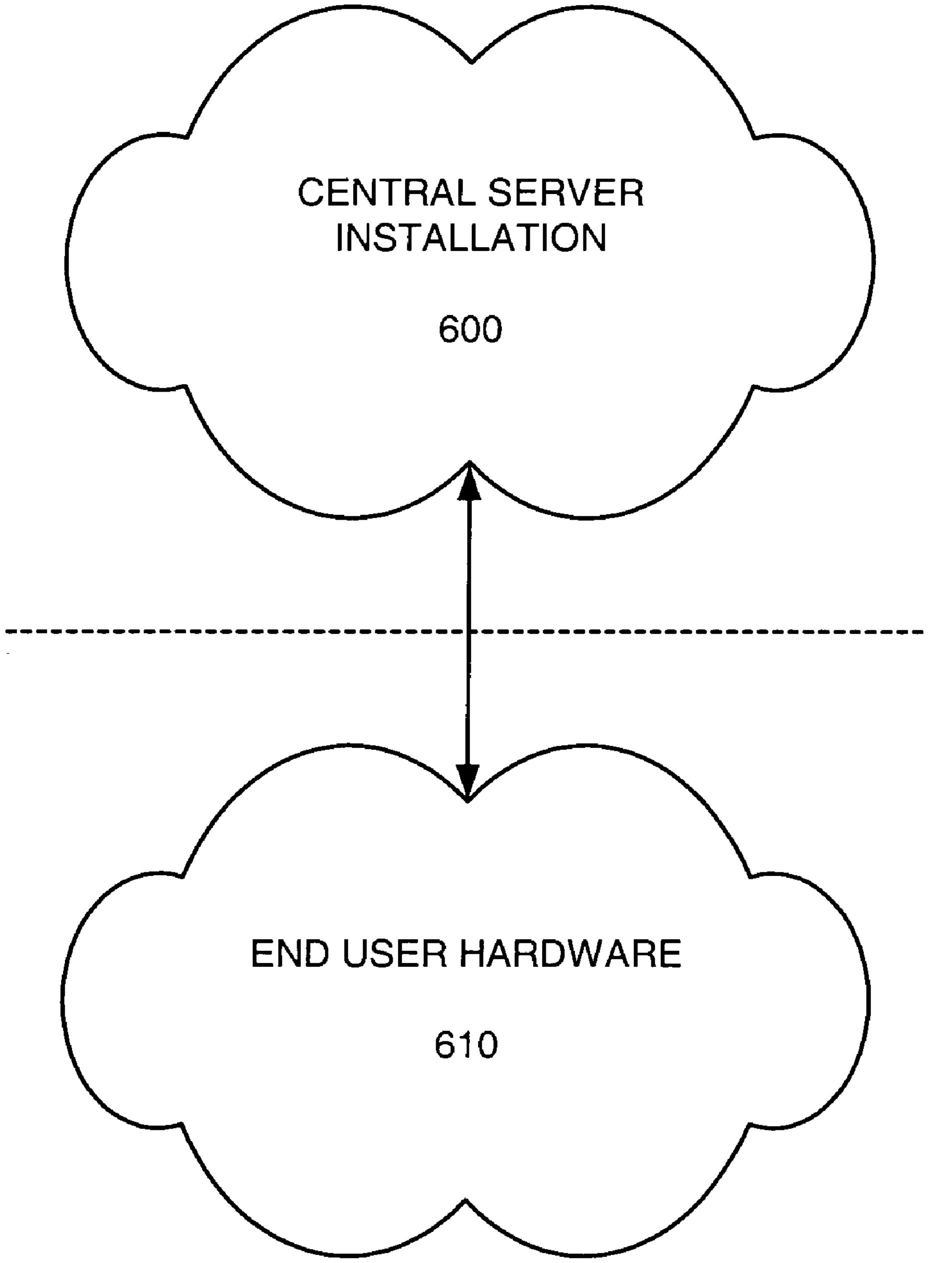
FIG. 6 shows an example of a thin client topology called a virtual desktop system architecture.

FIG. 6 shows an example of a thin client topology called a virtual desktop system architecture. The virtual desktop system architecture provides a re-partitioning of functionality between a central server installation 600 and end user hardware 610. Data and computational functionality are provided by data sources via a centralized processing arrangement. At the user end, all functionality is eliminated except that which generates output to the user (e.g., display and speakers), takes input from the user (e.g., mouse and keyboard) or other peripherals that the user may interact with (e.g., scanners, cameras, removable storage, etc.). All computing is done by the central data source and the computing is done independently of the destination of the data being generated. The output of the source is provided to a terminal, referred to here as a "Human Interface Device" (HID). The HID is capable of receiving the data and displaying the data.

Figure 7:
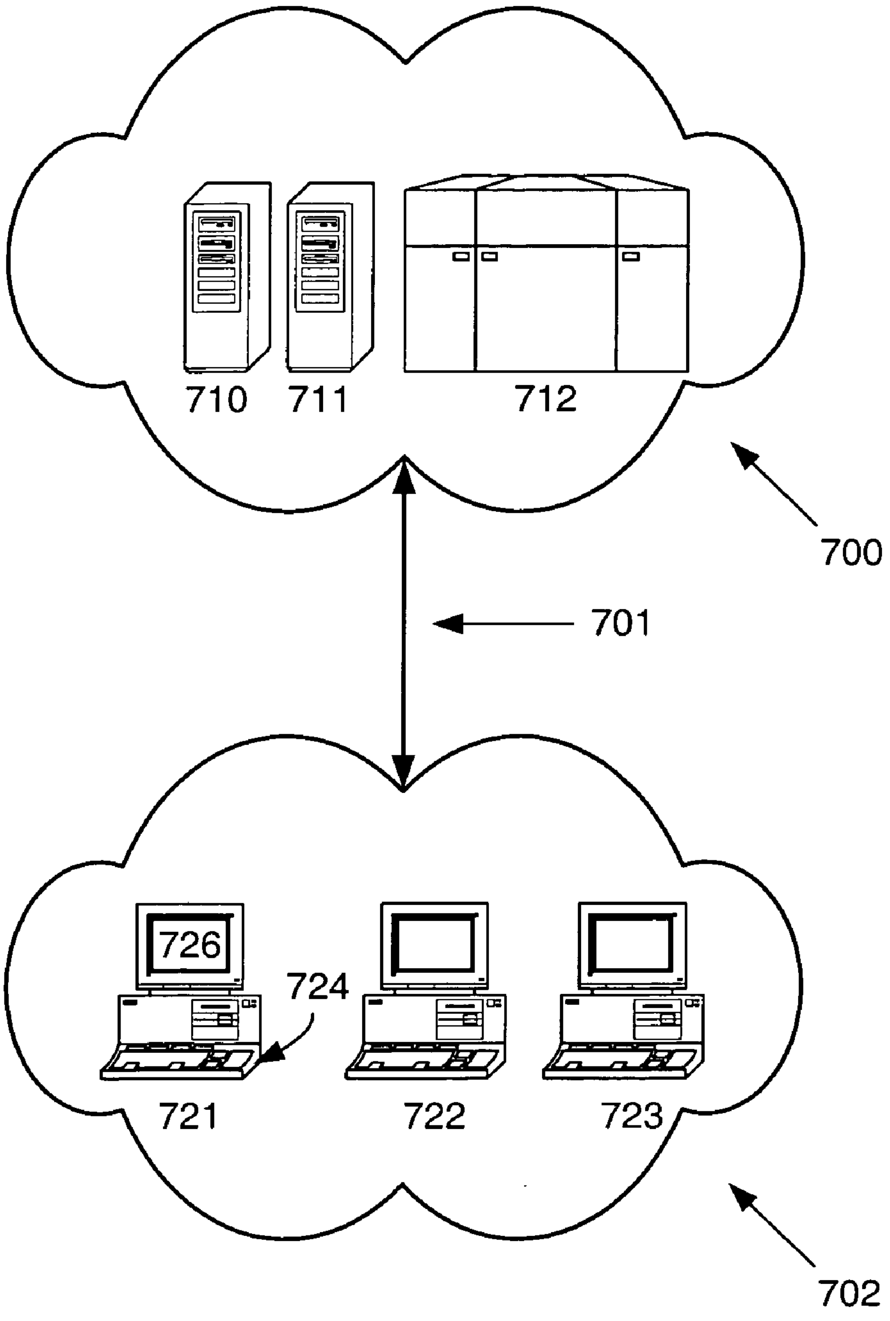
FIG. 7 displays the partitioning of the functionality of the virtual desktop system architecture.

The functionality of the virtual desktop system is partitioned between a display and input device such as a remote system and associated display device, and data sources or services such as a host system interconnected to the remote system via a communication link The display and input device is a human interface device (HID). The system is partitioned such that state and computation functions have been removed from the HID and reside on data sources or services. One or more services communicate with one or more HIDs through a communication link such as network An example of such a system is illustrated in FIG. 7, wherein the system comprises computational service providers 700 communicating data through communication link 701 to HIDs 702.

The computational power and state maintenance are provided by the service providers or services. The services are not tied to a specific computer, but may be distributed over one or more traditional desktop systems such as described in connection with FIG. 7, or with traditional servers. One computer may have one or more services, or a service may be implemented by one or more computers. The service provides computation, state and data to HIDs and the service is under the control of a common authority or manager. In FIG. 7, the services are provided by computers 710, 711, and 712. In addition to the services, a central data source can provide data to the HIDs from an external source such as for example the Internet or world wide web. The data source can also be broadcast entities such as those that broadcast data (e.g., television and radio signals).

Examples of services include X11/Unix services, archived or live audio or video services, Windows NT service, Java™ program execution service and others. A service herein is a process that provides output data and response to user requests and input. The service handles communication with an HID currently used by a user to access the service. This includes taking the output from the computational service and converting it to a standard protocol for the HID. The data protocol conversion is handled by a middleware layer, such as the X11 server, the Microsoft Windows interface, video format transcoder, the OpenGL® interface, or a variant of the java.awt.graphics class within the service producer machine. The service machine handles the translation to and from a virtual desktop architecture wire protocol described further below.

Each service is provided by a computing device optimized for its performance. For example, an Enterprise class machine could be used to provide X11/Unix service, a Sun MediaCenter™ could be used to provide video service, a Hydra based NT machine could provide applet program execution services.

The service providing computer system can connect directly to the HIDs through the interconnect fabric. It is also possible for the service producer to be a proxy for another device providing the computational service, such as a database computer in a three-tier architecture, where the proxy computer might only generate queries and execute user interface code.

The interconnect fabric can comprise any of multiple suitable communication paths for carrying data between the services and the HIDs. In one embodiment the interconnect fabric is a local area network implemented as an Ethernet network Any other local network may also be utilized. The invention also contemplates the use of wide area networks, the Internet, the world wide web, and others. The interconnect fabric may be implemented with a physical medium such as a wire or fiber optic cable, or it may be implemented in a wireless environment.

The interconnect fabric provides actively managed, low-latency, high-bandwidth communication between the HID and the services being accessed. One embodiment contemplates a single-level, switched network, with cooperative (as opposed to completing) network traffic. Dedicated or shared communications interconnects maybe used in the present invention.

The HID is the means by which users access the computational services provided by the services. FIG. 7 illustrates HIDs 721, 722 and 723. Each HID comprises a display 726, a keyboard 724, mouse 751, and audio speakers 750. The HID includes the electronics need to interface these devices to the interconnection fabric and to transmit to and receive data from the services.

Figure 8:
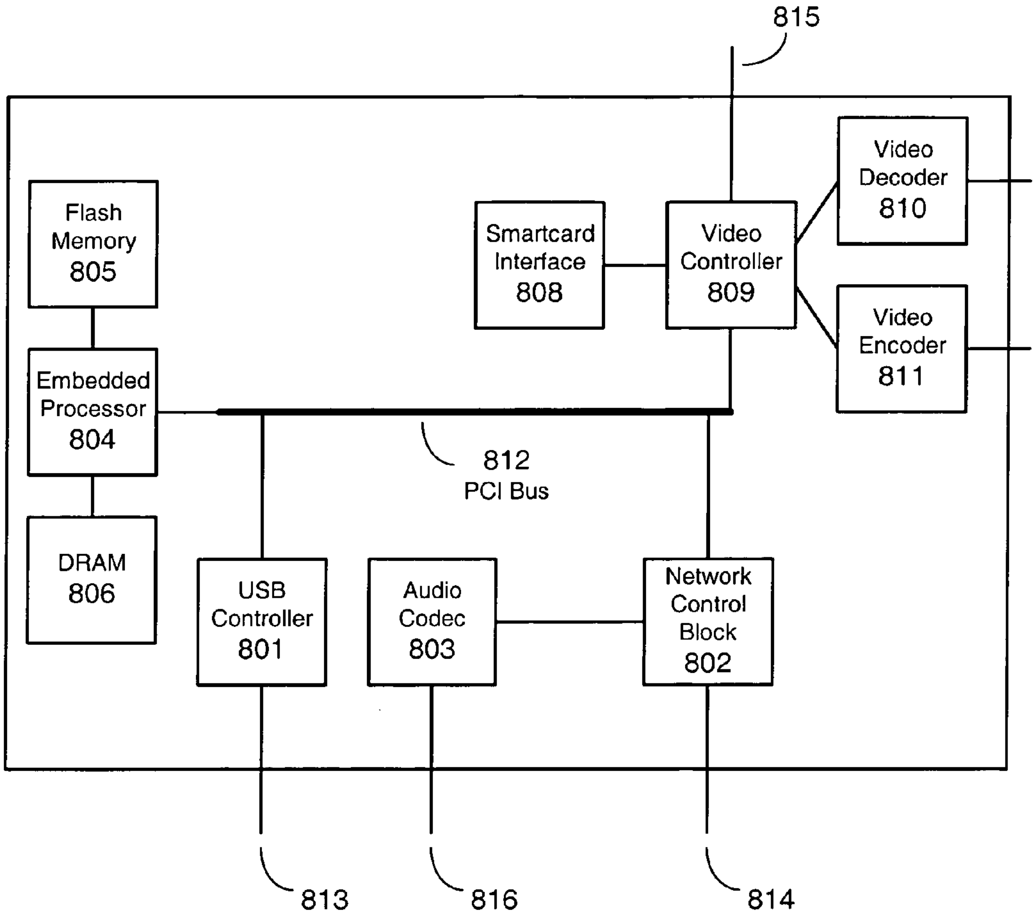
FIG. 8 is a block diagram of an example embodiment of a human interface device.

A block diagram of an example embodiment of the HID is illustrated in FIG. 8. The components of the HID are coupled internally to a PCI bus 812. Network control block 802 communicates to the interconnect fabric, such as an Ethernet, through line 814. An audio codec 803 receives audio data on interface 816 and is coupled to network control block 802. USB data communication is provided on lines 813 to a USB controller 801. The HID further comprises a embedded processor 804 such as a Sparc2ep with coupled flash memory 805 and DRAM 806. The USB controller 801, the network control block 802 and the embedded processor 804 are all coupled to the PCI bus 812. A video controller 809, also coupled to the PCI bus 812, can include an ATI RagePro+ frame buffer controller which provides SVGA output on the line 815. NTSC data is provided in and out of the video controller through video decoder 810 and encoder 811 respectively. A smartcard interface 808 may also be coupled to the video controller 809.

Figure 9:
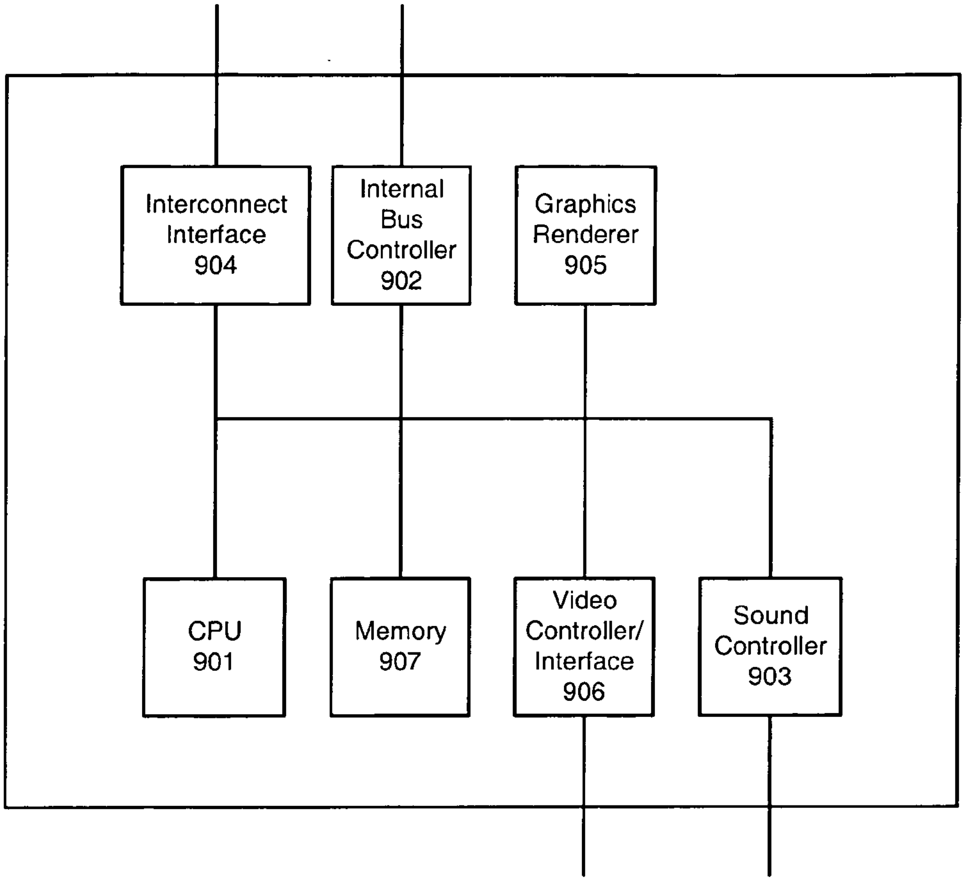
FIG. 9 is a block diagram of a single chip implementation of a human interface device.

Alternatively, the HID can comprise a single chip implementation as illustrated in FIG. 9. The single chip includes the necessary processing capability implemented via CPU 901 and graphics renderer 905. Chip memory 907 is provided, along with video controller/interface 906. At internal bus (USB) controller 902 is provided to permit communication to a mouse, keyboard and other local devices attached to the HID. A sound controller 903 and interconnect interface 904 are also provided. The video interface shares memory 907 with the CPU 901 and graphics renderer 905. The software used in this embodiment may reside locally in on-volatile memory or it can be loaded through the interconnection interface when the device is powered.

The operation of the virtual desktop system architecture is described in co-pending U.S. patent application Ser. No. 09/063,335, filed Apr. 20, 1998, entitled "Method and Apparatus for Providing A Virtual Desktop System Architecture" and assigned to the present assignee, and incorporated herein by reference.

Embodiment of Computer Execution Environment (Hardware)

Figure 10:
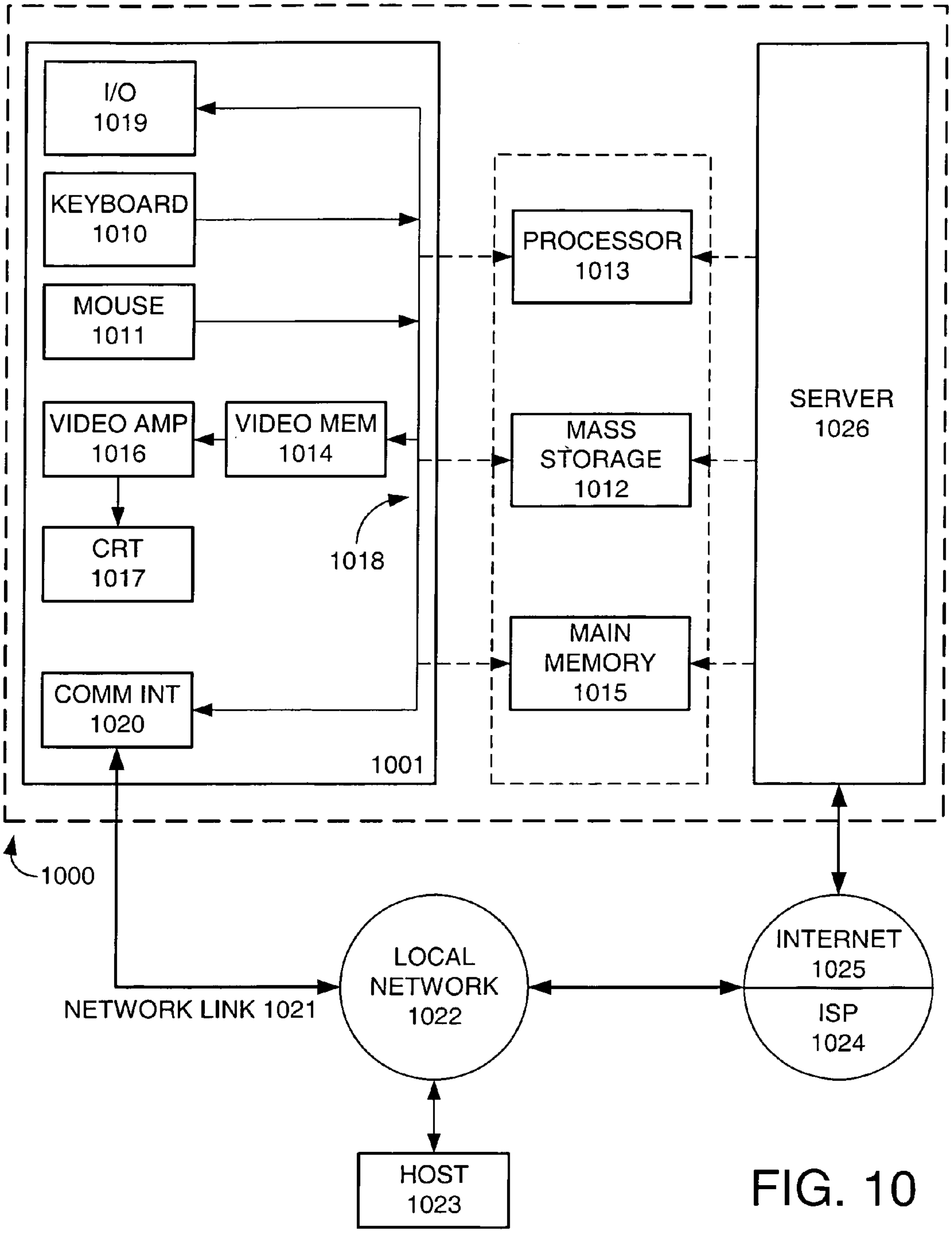
FIG. 10 is an embodiment of a computer execution environment suitable for the present invention.

An embodiment of the invention can be implemented as computer software in the form of computer readable program code executed in a general purpose computing environment such as environment 1000 illustrated in FIG. 10, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 1010 and mouse 1011 are coupled to a system bus 1018. The keyboard and mouse are for introducing user input to the computer system and communicating that user input to central processing unit (CPU) 1013. Other suitable input devices maybe used in addition to, or in place of, the mouse 1011 and keyboard 1010. I/O (input/output) unit 1019 coupled to bi-directional system bus 1018 represents such I/O elements as a printer, A/V (audio/video) I/O, etc.

Computer 1001 may include a communication interface 1020 coupled to bus 1018. Communication interface 1020 provides a two-way data communication coupling via a network link 1021 to a local network 1022. For example, if communication interface 1020 is an integrated services digital network (ISDN card or a modem, communication interface 1020 provides a data communication connection to the corresponding type of telephone line, which comprises part of network link 1021. If communication interface 1020 is a local area network (LAN) card, communication interface 1020 provides a data communication connection via network link 1021 to a compatible LAN. Wireless links are also possible. In any such implementation, communication interface 1020 sends and receives electrical, electromagnetic or optical signals which carry digital data streams representing various types of information.

Network link 1021 typically provides data communication through one or more networks to other data devices. For example, network link 1021 may provide a connection through local network 1022 to host 1023 or to data equipment operated by ISP 1024. ISP 1024 in turn provides data communication services through the world wide packet data communication network now commonly referred to as the "Internet" 1025. Local network 1022 and Internet 1025 may use electrical, electromagnetic or optical signals which carry digital data streams. The signals through the various networks and the signals on network link 1021 and through communication interface 1020, which carry the digital data to and from computer 1000, are exemplary forms of carrier waves transporting the information.

Processor 1013 may reside wholly on client computer 1001 or wholly on server 1026 or processor 1013 may have its computational power distributed between computer 1001 and server 1026. Server 1026 symbolically is represented in FIG. 10 as one unit, but server 1026 can also be distributed between multiple "tiers". In one embodiment, server 1026 comprises a middle and back tier where application logic executes in the middle tier and persistent data is obtained in the back tier. In the case where processor 1013 resides wholly on server 1026, the results of the computations performed by processor 1013 are transmitted to computer 1001 via Internet 1025, Internet Service Provider (ISP) 1024, local network 1022 and communication interface 1020. In this way, computer 1001 is able to display the results of the computation to a user in the form of output.

Computer 1001 includes a video memory 1014, main memory 1015 and mass storage 1012, all coupled to bi-directional system bus 1018 along with keyboard 1010, mouse 1011 and processor 1013. As with processor 1013, in various computing environments, main memory 1015 and mass storage 1012, can reside wholly on server 1026 or computer 1001, or they may be distributed between the two. Examples of systems where processor 1013, main memory 1015, and mass storage 1012 are distributed between computer 1001 and server 1026 include the thin-client computing architecture developed by Sun Microsystems, Inc., the palm pilot computing device and other personal digital assistants, Internet ready cellular phones and other Internet computing devices, and in platform independent computing environments, such as those that utilize the Java technologies also developed by Sun Microsystems, Inc.

The mass storage 1012 may include both fixed and removable media, such as magnetic, optical or magnetic optical storage systems or any other available mass storage technology. Bus 1018 may contain, for example, thirty-two address lines for addressing video memory 1014 or main memory 1015. The system bus 1018 may also include, for example, a 32-bit data bus for transferring data between and among the components, such as processor 1013, main memory 1015, video memory 1014 and mass storage 1012. Alternatively, multiplex data/address lines maybe used instead of separate data and address lines.

In one embodiment of the invention, the processor 1013 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 1015 may be comprised of dynamic random access memory (DRAM). Video memory 1014 maybe a dual-ported video random access memory. One port of the video memory 1014 maybe coupled to video amplifier 1016. The video amplifier 1016 maybe used to drive a display/output device 1017, such as a cathode ray tube (CRT) raster monitor. Video amplifier 1016 is well known in the art and may be implemented by any suitable apparatus. This circuitry converts pixel data stored in video memory 1014 to a raster signal suitable for use by display/output device 1017. Display /output device 1017 maybe any type of monitor suitable for displaying graphic images.

Computer 1001 can send messages and receive data, including program code, through the network(s), network link 1021, and communication interface 1020. In the Internet example, remote server computer 1026 might transmit a requested code for an application program through Internet 1025, ISP 1024, local network 1022 and communication interface 1020. The received code may be executed by processor 1013 as it is received, and/or stored in mass storage 1012, or other non-volatile storage for later execution. In this manner, computer 1000 may obtain application code in the form of a carrier wave. Alternatively, remote server computer 1026 may execute applications using processor 1013, and utilize mass storage 1012, and/or video memory 1015. The results of the execution at server 1026 are then transmitted through Internet 1025, ISP 1024, local network 1022 and communication interface 1020. In this example, computer 1001 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for example only. An embodiment of the invention may be implemented in any type of computer system or programming or processing environment.

Thus, a system for identification of smart cards is described in conjunction with one or more specific embodiments. The invention is defined by the claims and their full scope of equivalents.

The invention claimed is:

1. A method for identifying a smart card comprising:
presenting said smart card to a computing device;
extracting a token ID from said smart card;
consulting a probe order file to obtain a path for a configuration file;
obtaining a token type by consulting the configuration file; and
using said token ID and said token type to identify said smart card.

2. The method of claim 1 further comprising:
establishing a communication channel between said computing device and a remote computer.

3. The method of claim 2 wherein said remote computer comprises a server.

4. The method of claim 2 wherein said configuration file resides on said remote computer.

5. The method of claim 1 wherein said probe order file resides on said remote computer.

6. The method of claim 1 wherein said computing device comprises a human interface device.

7. The method of claim 1 wherein said smart card comprises a MicroPayflex smart card.

8. A computer program product comprising:
a computer usable medium having computer readable program code embodied therein configured to identify a smart card, said computer usable medium comprising:
computer readable code configured to cause a user to present said smart card to a computing device;
computer readable code configured to cause said computing device to extract a token ID from said smart card;
computer readable code configured to cause said computing device to consult a probe order file to obtain a path for a configuration file;
computer readable code configured to cause said computing device to obtain a token type by consulting the configuration file; and
computer readable code configured to cause said computing device to use said token ID and said token type to identify said smart card.

9. The computer program product of claim 8 further comprising:
computer readable code configured to cause said computing device to establish a communication channel between said computing device and a remote computer.

10. The computer program product of claim 9 wherein said remote computer is a server.

11. The computer program product of claim 8 wherein said configuration file resides on said remote computer.

12. The computer program product of claim 8 wherein said probe order file resides on said remote computer.

13. The computer program product of claim 8 wherein said computing device is a human interface device.

14. The method of claim 13 wherein said smart card is a MicroPayflex.

15. A system for identifying a smart card comprising:
a smart card configured to be presented to a computing device;
a token ID configured to be extracted from said smart card; and
a probe order file, which directs the computing device to a configuration file that is adept to identify a token type, wherein said token ID and said token type are used to identify said smart card.

16. The system of claim 15 further comprising:
a communication channel between said computing device and a remote computer.

17. The system of claim 16 wherein said remote computer is a server.

18. The system of claim 17 wherein said configuration file resides on said server.

19. The system of claim 17 wherein said probe order file resides on said server.

20. The system of claim 15 wherein said token type on said remote computer.

21. The system of claim 15 wherein said computing device comprises a human interface device.

22. The system of claim 15 wherein said smart card comprises a MicroPayflex smart card.

* * * * *